Nov. 25, 1930.  J. F. NIELSEN  1,782,907

REMOTE CONTROL SYSTEM

Filed Jan. 26, 1925

Inventor:
John F. Nielsen
by E. W. Adams, Atty.

Patented Nov. 25, 1930

1,782,907

UNITED STATES PATENT OFFICE

JOHN F. NIELSEN, OF LONG ISLAND CITY, NEW YORK, ASSIGNOR TO WESTERN ELECTRIC COMPANY, INCORPORATED, OF NEW YORK, N. Y., A CORPORATION OF NEW YORK

REMOTE CONTROL SYSTEM

Application filed January 26, 1925. Serial No. 4,982.

This invention relates to remote control apparatus and more particularly to a system for controlling the position of a plurality of elements in a radio transmitting apparatus from a distance and indicating the position of the elements.

An object of the invention is to provide a system of remote control for radio apparatus. A further object is to provide a system for selectively adjusting the elements of a radio transmitting or receiving apparatus from a distance and indicating the adjusted position of the various elements.

These objects and others, which will be apparent as the nature of the invention is disclosed, are accomplished by employing a step-by-step selector adapted to pick out the element which it is desired to adjust and then transmitting a series of polarized impulses from the control station to operate a polarized relay whereby the selected element is adjusted. A single line may be used to control the operation of the step-by-step selector and the polarized relay.

Although the novel features which are believed to be characteristic of this invention will be pointed out with particularity in the claims appended hereto, the apparatus itself, its objects and advantages, the details of its organization and the manner of its operation will be better understood by referring to the following description taken in connection with accompanying drawing of which Fig. 1 is a diagrammatic representation of the circuits and apparatus employed in carrying out one form of this invention;

Figure 1:
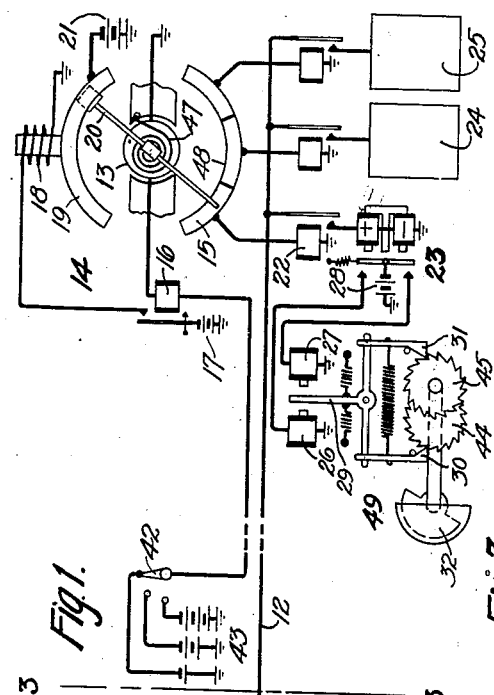

In Fig. 1 is shown a plurality of knobs 1, which are adapted to control toothed wheel 2 mounted on shaft 51, by means of worm gears 3 and releasable clutches 4. Spiral springs 5 serve to maintain clutches 4 in a disengaged relation when not in use and to provide friction to prevent knobs 1 from being turned accidentally. Cam switches 6 and 7, operated by levers pivoted at 8 and 9 respectively, and engaging with toothed wheel 2 close the circuit from one or other of the oppositely poled sources 10 and 11 to line 12 as wheel 2 is rotated. Clockwise rotation of wheel 2 in the arrangement shown in the drawing will complete circuit from source 10 intermittently while a counter-clockwise direction will operate switch 7 and complete the source 11. By this means the polarity of the transmitted impulses is reversed when the direction of rotation is reversed.

Figure 2:
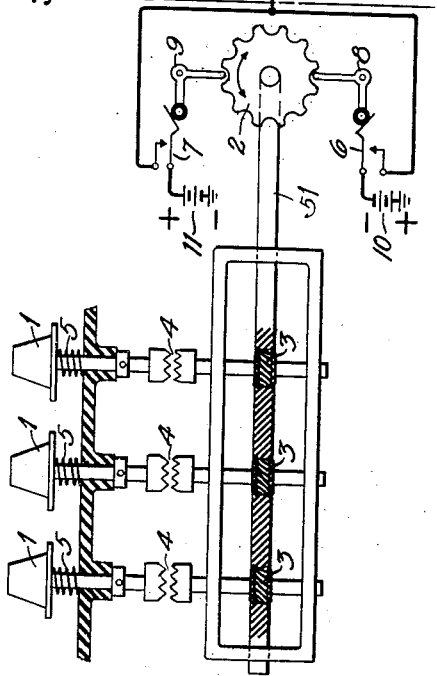
Fig. 2 is an elevation, partly in section, of the selector shown in Fig. 1.
Figure 2:
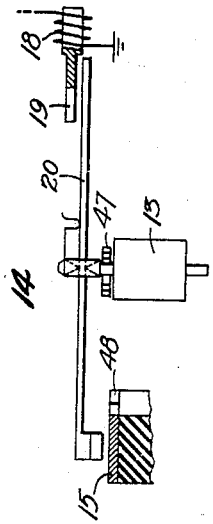

Switch 42, which is separately controlled, completes the circuit from source 43 through relay 16 and through the moving coil 13 of a moving coil galvanometer type relay 14. By varying the position of switch 42, different voltages may be applied to the relay 14, causing the coil 13 to assume different angular displacements against the control of spring 47. Relay 16, which is slow acting, completes the circuit from source 17 through coil 18, after the relay coil has assumed a position corresponding to the voltage applied whereby core 19 is magnetized. Attached to the relay moving coil 13 is a conducting arm 20 of magnetic material one end of which traverses the armature 19 and the other a segmented contact ring 48. The arm 20 is pivoted, as shown by the detailed view in Fig. 2, on coil 13, and is normally out of contact with armature 19 and ring 48 but is pulled into contact with both when the coil 18 is energized.

In the position shown in the diagram, contact arm 20 closes the circuit from source 21 through segment 15 and relay 22. Relay 22 operates to complete the circuit through polarized relay 23 from line 12 thereby directing the impulses to the stepping mechanism 49. Other stepping mechanisms 24 or 25 would be selected by the galvanometer 14 were a different potential applied to the coil 13 from the source 43 whereby a different deflection of the relay coil 13 would be produced and contact made to other segments of the ring 48.

A polarized impulse over the line 12 will operate relay 23 to complete the circuit from source 28 through electromagnets 26 or 27 according to the polarity of the impulse.

Pivoted arm 29, magnetically associated with coils 26 and 27, operates pawls 30 and 31 to advance toothed wheels 44 and 45, step-by-step, and thereby operate the associated instrument 32. Electromagnet 26 will operate pawl 30 to rotate instrument 32 in one direction while electromagnet 27 will operate pawl 31 to cause rotation in the other direction. Although instrument 32 is here shown as a condenser, it is so shown by way of illustration only as other adjustable devices could be substituted therefor. When switch 42 is opened electromagnet 16 breaks the circuit through coil 18 and the galvanometer assumes a neutral position disconnecting relay 23.

Figure 3:
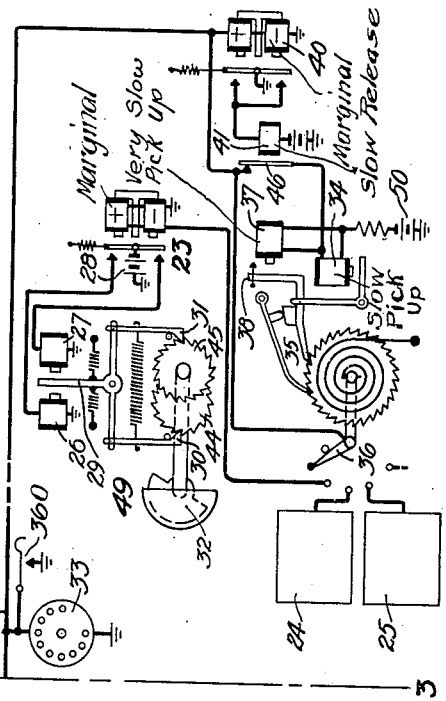
Fig. 3 shows a modification of that portion of Fig. 1 to the right of the line 3—3.

In the modification shown in Fig. 3 a rotating dial switch 33 such as described in U. S. Patent No. 1,161,854, November 30, 1915, to Forsberg, for example, is used to transmit a series of impulses from source 50 over line 12 to operate a stepping mechanism 35 by means of which contact arm 36 is rotated to select the particular apparatus it is desired to adjust. Each time the circuit is closed by switch 33, relay 34 is energized and through its armature advances the stepping mechanism 35 one step. Relay 37 is a slow pick-up relay and is not affected by these impulses. The circuit is from ground, through battery 50 and relay 34, armature 46, line 12 and switch 33 to ground.

When the stepping mechanism has selected the desired apparatus, polarized impulses over the line 12 will operate polarized relay 40 to close the circuit through electromagnet 41, which attracts its armature 46 and breaks the circuit through magnet 34. These polarized impulses will pass through the contact arm 36 to the particular device selected, for example relay 23, which operates as described in connection with Fig. 1.

Relays 40 and 41 are designed to operate before relay 34 to prevent stepping mechanism 35 from operating in response to impulses from sources 10 or 11. This may be accomplished by using a comparatively slow operating relay 34 and adjusting the speed of dial 33 to correspond thereto. Electromagnet 37 should be considerably slower than magnet 34 in order not to operate in response to impulses from dial 33. Relay 41 should be slow to release to prevent it closing between impulses while relay 40 is operating.

Relays 23 and 40 are of high resistance to prevent magnet 34 acting when source 50 is grounded through these relays. It is also desirable to employ sources 10 and 11 of higher voltage than source 50 to prevent the relays 23 or 40 which respond only to this higher voltage from operating in response to current from source 50. Key 360 is used to energize slow pick-up relay 37, which will attract armature 38 and release the step-by-step mechanism when adjustment is completed. Spring 39 then causes the mechanism to assume its original position.

By means of the apparatus herein described, it is possible to control the position of a plurality of units at a distant station by means of a single connecting line and also to indicate the position of the units. When the desired unit is selected, either by the selector switch 42 or dial 33, the knob corresponding to this unit is used to rotate wheel 2 and transmit positive or negative impulses over the line according to the direction of rotation. When that particular knob is released, it will retain its last position due to the friction of springs 5 and thereby indicate the position to which the device has been adjusted. After the device has been adjusted the release key 360 is pressed, which restores the selector to its original position from which any other apparatus may be selected and adjusted in the same manner.

Although particular circuits and apparatus have been illustrated and described, it should be understood that the invention is not limited thereto, but is of general application and is only to be limited in accordance with the spirit of the invention as defined by the following claims.

What is claimed is:

1. A remote control system comprising a station, a plurality of devices thereat movable in opposite directions to a plurality of positions, polarized relay means associated with each device for moving it in opposite directions depending upon the polarity of the impulses supplied to the relay means and to an extent depending upon the number of such impulses, a remote station, a line connecting the remote station with the first mentioned station, selecting means at the first mentioned station for selectively associating said polarized relay means with said line, means for controlling said selecting means in response to impulses transmitted over said line, said means for controlling said selecting means being operated by impulses of less strength than that required to effectively operate the polarized relay means, means at the remote station for sending impulses over said line of a strength to operate only the selector controlling means, means at the remote station for transmitting impulses of positive or negative polarity of increased strength over said line, and means associated with said line and responsive to the increased strength impulses of either polarity to disassociate the means for controlling the selector from said line while said increased strength impulses are being transmitted.

2. A remote control system comprising a control station, a plurality of devices to be selectively adjusted, a polarized relay of the marginal type for adjusting each of said devices in opposite senses depending upon the polarity of the impulses supplied thereto, transmission means adapted to interconnect the control station and the relays, a contact associated with each of said relays, a contactor adapted to move from a normal position along said contacts in succession for selectively associating said polarized relays with said transmission means, means responsive to uni-directional impulses of short duration for moving said contactor from said normal position along said contacts, means responsive to uni-directional impulses of longer duration for moving said contactor in the opposite direction to restore it to said normal position, means at said control station for transmitting over said transmission means uni-directional impulses of short and long duration for operating the two contact moving means respectively and of insufficient amplitude to operate said polarized relays, means at said control station for transmitting over said transmitting means uni-directional impulses of positive and negative polarity and increased strength for operating the selected polarized relay, and means responsive to said impulses of positive and negative polarity for disassociating said contactor moving means from the transmission means while said impulses of positive and negative polarity are being transmitted.

3. A remote control system comprising a control station, a controlled station, transmission means connecting said stations, a plurality of devices to be selectively adjusted located at said control station, means associated with and for adjusting each of said devices, means comprising a contact associated with each of the adjusting means and a contactor for selectively associating said adjusting means with said transmission means, means for operating said contactor in one direction to selectively associate said adjusting means with said transmission means, means for operating said contactor in the opposite direction to restore it to a normal position, means for transmitting from said control station and over said transmission means impulses of such a character as to operate the first mentioned contactor operating means to the exclusion of said adjusting means and said second mentioned contactor operating means, means for transmitting from said control station and over said transmission means impulses of such a character as to operate the second contactor operating means to the exclusion of said adjusting means, means for transmitting from said control station and over said transmission means impulses for operating said adjusting means, all of said impulses lying in the same frequency range, and means responsive to the last mentioned impulses for preventing the operation of either of said contactor operating means in response thereto.

4. In combination, a control station, a controlled station, transmission means connecting said stations, a plurality of devices to be selectively adjusted located at said controlled station, polarized relay means associated with each of said devices for adjusting said devices in opposite directions to a plurality of degrees in each direction, a step-by-step mechanism for selectively associating said polarized relay means with said transmission means, said mechanism comprising a toothed wheel, a pivoted armature adapted to rotate said wheel, electromagnetic means for operating said armature to rotate said wheel in one direction, and other electromagnetic means to operate said armature to permit said wheel to operate in the opposite direction for restoring it to a normal position, means for transmitting from said control station and over said transmission means uni-directional impulses of such a character as to operate the first mentioned electromagnetic means to the exclusion of said other electromagnetic means and said polarized relay means, means for transmitting from said control station and over said transmission means impulses of such a character as to operate said other electromagnetic means to the exclusion of said polarized relay means, means for transmitting from said control station and over said transmission means uni-directional impulses of positive or negative polarity for operating said polarized relay means, all of said impulses lying in the same frequency range, and means responsive to said uni-directional impulses of positive or negative polarity for preventing the operation of the two electromagnetic means.

5. In combination, a control station, a plurality of devices to be selectively adjusted, polarized relay means of the marginal type associated with each of said devices for adjusting that device in opposite senses depending upon the polarity of the impulses supplied thereto, a contact associated with each of the polarized relays, a step-by-step mechanism comprising a toothed wheel, an electromagnet having a pivoted armature for rotating said wheel, a second electromagnetic means adapted to release said wheel to restore it to normal position, and a contactor rotated by said wheel for selectively contacting with said contacts, transmission means interconnecting said control station and said second electromagnetic means and contactor, means at said control station for transmitting over said transmission means uni-directional impulses of such amplitude as to operate said electromagnetic means to the exclusion of said polarized relays, a plurality of dials having releasable clutches and adapted to transmit from said control station over said transmission means polarized impulses of positive or negative polarity depending on the direction of rotation of said dials for operating the selected polarized relay, and means responsive to said polarized impulses of positive or negative polarity for disassociating said electromagnets from said transmission means while said polarized impulses are being transmitted.

6. In a remote control system, a plurality of devices to be selectively adjusted, polarized relays of the marginal type for adjusting said devices, contacts associated with said polarized relays, control circuits associated with said polarized relays and including electromagnetic means and reversble step-by-step mechanisms for adjusting said devices in opposite directions in response to polarized impulses supplied to said polarized relays, a step-by-step mechanism comprising a toothed wheel, an electromagnet responsive to impulses of short duration having a pivoted armature for operating said wheel, an electromagnet of the retarded type having an armature adapted to lift the first mentioned armature to restore the step-by-step mechanism to a normal position and a contactor operated by said toothed wheel to selectively contact with said contacts, a transmission medium, and a distantly located control station comprising a rotating selector switch for transmitting over said transmission medium uni-directional impulses of short duration for operating the first mentioned electromagnet, means for transmitting over said transmission medium an impulse of longer duration for operating said electromagnet of the retarded type, means comprising a toothed wheel and cam operating switches associated therewith, one switch being operated by a clockwise rotation of said toothed wheel and the other by a counter-clockwise rotation of said toothed wheel for transmitting over said transmission medium a series of polarized impulses of such amplitude as to operate the selected polarized relay, a plurality of knobs, a releasable clutch associated with each of said knobs for permitting the knobs to be selectively associated with said wheel and dials associated with said knobs for indicating the position of the corresponding adjustable device.

7. A remote control system, comprising a controlled station, a plurality of devices thereat to be selectively adjusted, a control station, a line connecting said stations, means at said controlled station for selectively associating said devices with said line, means associated with each of said devices for adjusting that device, means for transmitting over said line a series of impulses of such a character as to operate only the selecting means, means for transmitting over said line a second series of impulses for operating said adjusting means, and means at said controlled station responsive to said second series of impulses for disconnecting said selecting device from said line while said second series of impulses are being transmitted.

8. A system in accordance with the next preceding claim in which said second series of impulses are both positive and negative in polarity and the means for disconnecting the selecting device from the line comprises a polarized relay.

9. In a remote control system, a control station, a controlled station comprising a plurality of devices to be selectively adjusted, a line connecting said stations, electromagnetic means for adjusting each of said devices in one sense, a second electromagnetic means for adjusting each of said devices in an opposite sense, a polarized relay associated with each of said devices and responsive to uni-directional impulses of one polarity for operating one of the corresponding electromagnetic means and responsive to uni-directional impulses of the opposite polarity for operating the other of the corresponding electromagnetic means, means for selectively associating the polarized relays with said line, means at said control station for transmitting over said line uni-directional impulses of such a character as to operate the selecting means to the exclusion of said polarized relays, means at said control station for transmitting over said line uni-directional impulses of positive and negative polarity for operating the selected polarized relay, and means responsive to said uni-directional impulses of positive and negative polarity for rendering said selecting means inoperative while said uni-directional impulses of positive and negative polarity are being transmitted.

10. In a remote control system, a control station, a controlled station comprising a plurality of devices to be selectively adjusted, transmission means interconnecting said stations, polarized relay means for adjusting each of said devices in a plurality of directions and to a plurality of degrees in each direction, means for selectively associating said polarized relay means with said transmission means, means for transmitting from said control station impulses of such a character as to operate the selecting means to the exclusion of said polarized relay means, means for transmitting from said control station impulses of positive and negative polarity for operating said polarized means in a direction depending upon the polarity of said impulses and to a degree depending upon the number of said impulses, and means responsive to the last mentioned impulses for disassociating said selecting means from said transmission means while said last mentioned impulses are being transmitted.

In witness whereof I hereunto subscribe my name this 22 day of January, A. D. 1925.

JOHN F. NIELSEN.